US009521103B2

(12) United States Patent
Li

(10) Patent No.: US 9,521,103 B2
(45) Date of Patent: Dec. 13, 2016

(54) METHOD, APPARATUS, AND SYSTEM FOR NOTIFYING AND LEARNING ADDRESS INFORMATION INVALIDATION

(71) Applicant: Huawei Technologies Co., Ltd., Shenzhen (CN)

(72) Inventor: Hong Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 341 days.

(21) Appl. No.: 13/848,375

(22) Filed: Mar. 21, 2013

(65) Prior Publication Data

US 2013/0275529 A1 Oct. 17, 2013

(30) Foreign Application Priority Data

Mar. 21, 2012 (CN) .......................... 2012 1 0076325

(51) Int. Cl.
G06F 15/16 (2006.01)
H04L 12/58 (2006.01)
H04W 76/06 (2009.01)

(52) U.S. Cl.
CPC .............. *H04L 51/28* (2013.01); *H04W 76/06* (2013.01)

(58) Field of Classification Search
CPC ................................. H04L 51/28; H04L 76/06
See application file for complete search history.

(56) References Cited

U.S. PATENT DOCUMENTS 8,855,052 B2 * 10/2014 Sun ..................... H04W 76/027
370/328
2008/0274736 A1 * 11/2008 Hu ................................ 455/433
2008/0316918 A1 12/2008 Sakauchi
(Continued)

FOREIGN PATENT DOCUMENTS

CN 101378504 A 3/2009
CN 101415172 A 4/2009
(Continued)

OTHER PUBLICATIONS

Droms, "Dynamic Host Configuration Protocol" Network Working Group, Mar. 1997, 41 pages.
(Continued)

*Primary Examiner* — Ryan Jakovac
(74) *Attorney, Agent, or Firm* — Brinks Gilson & Lione

(57) ABSTRACT

The present invention discloses a method, an apparatus, and a system for notifying and learning address information invalidation. The present invention includes: receiving, by a mobile device, a first notification message that indicates release of a default bearer and is sent by a core network, where the first notification message includes a first default bearer that is allocated to the mobile device and already released by the core network; determining, by the mobile device and according to the first default bearer, address information corresponding to the first default bearer; and sending, by the mobile device and to a terminal device, a second notification message indicating address information invalidation, where the second notification message includes the address information invalidation indication information and the address information corresponding to the first default bearer, so that the terminal device deletes the address information corresponding to the first default bearer.

11 Claims, 6 Drawing Sheets

(56) References Cited

U.S. PATENT DOCUMENTS

| | | | |
|---|---|---|---|
| 2009/0265767 A1* | 10/2009 | Rune et al. ........................ | 726/5 |
| 2010/0034083 A1* | 2/2010 | Prakash ................ | H04W 28/18 |
| | | | 370/230.1 |
| 2011/0228852 A1 | 9/2011 | Budagavi | |
| 2012/0020318 A1* | 1/2012 | Naoe ....................... | H04W 8/26 |
| | | | 370/329 |

FOREIGN PATENT DOCUMENTS

| | | |
|---|---|---|
| CN | 101583036 A | 11/2009 |
| CN | 101795409 A | 8/2010 |
| CN | 101835047 A | 9/2010 |
| CN | 102196255 A | 9/2011 |

OTHER PUBLICATIONS

Nartan et al., "Neighbor Discovery for IP Version 6 (IPv6)" Network Working Group, Dec. 1998, 84 pages.

Lte, "$3^{rd}$ Generation Partnership Project; Technical Specification Group Core Network and Terminals; Non-Access-Stratum (NAS) protocol for Evolved Packet System (EPS)" Stage 3 (Release 9) 3GPP TS 24.301, V9.6.0, Mar. 2011, 298 pages.

Lte, "$3^{rd}$ Generation Partnership Project; Technical Specification Group Services and System Aspects; General Packet Radio Service (GPRS) enhancements for Evolved Universal Terrestrial Radio Access Network (E-UTRAN) access" (Release 9) 3GPP TS 23.401, V9.8.0, Mar. 2011, 259 pages.

\* cited by examiner

US 9,521,103 B2

METHOD, APPARATUS, AND SYSTEM FOR NOTIFYING AND LEARNING ADDRESS INFORMATION INVALIDATION

CROSS-REFERENCE TO RELATED APPLICATION

This application claims priority to Chinese Patent Application No. 201210076325.9, filed on Mar. 21, 2012, which is hereby incorporated by reference in its entirety.

FIELD OF THE INVENTION

The present invention relates to the field of communications technologies, and in particular, to a method, an apparatus, and a system for notifying and learning address information invalidation.

BACKGROUND OF THE INVENTION

At present, terminal devices such as a notebook computer or a desktop computer may implement Internet access services such as Internet surfing through mobile devices such as a data card.

A mobile device obtains, through a default bearer activation procedure, a default bearer allocated by a core network to the mobile device, and activates a virtual network card of a terminal device, where the default bearer corresponds to one piece of address information allocated by the core network to the mobile device. The virtual network card of the terminal device corresponds to one piece of address information, so that the terminal device implements an Internet access service by using the address information. In the prior art, when the address information is invalidated because the corresponding default bearer is released by the core network, the mobile device deactivates the virtual network card, so as to close all data channels between the terminal device and the mobile device, and make the terminal device cease the Internet access service. In the prior art, when one virtual network card corresponds to multiple pieces of address information, and if only one piece of the address information is invalidated, the mobile device also deactivates the virtual network card to close all data channels between the terminal device and the mobile device, which affects the use of non-invalidated address information by the terminal device.

SUMMARY OF THE INVENTION

Embodiments of the present invention provide a method and an apparatus for notifying and learning address information invalidation, which can guarantee the use of non-invalidated address information by a terminal device.

To achieve the above objective, the embodiments of the present invention adopt the following technical solutions.

A method for notifying address information invalidation includes:

receiving, by a mobile device, a first notification message that indicates release of a default bearer and is sent by a core network, where the first notification message includes a first default bearer that is allocated to the mobile device and already released by the core network;

determining, by the mobile device and according to the first default bearer, address information corresponding to the first default bearer; and sending, by the mobile device and to a terminal device, a second notification message indicating address information invalidation, where the second notification message includes address information invalidation indication information and the address information corresponding to the first default bearer, so that the terminal device deletes, according to the address information invalidation indication information, the address information corresponding to the first default bearer.

A method for learning address information invalidation includes:

receiving, by a terminal device, a notification message that indicates address information invalidation and is sent by a mobile device, where the notification message includes address information invalidation indication information and address information corresponding to a first default bearer, and the first default bearer is a default bearer that is allocated to the mobile device and already released by a core network; and deleting, by the terminal device and according to the address information invalidation indication information, the address information corresponding to the first default bearer.

A mobile device includes:

a receiving unit, configured to receive a first notification message that indicates release of a default bearer and is sent by a core network, where the first notification message includes a first default bearer that is allocated to the mobile device and already released by the core network;

a determination unit, configured to determine, according to the first default bearer received by the receiving unit, address information corresponding to the first default bearer; and a sending unit, configured to send, to a terminal device, a second notification message indicating address information invalidation, where the second notification message includes address information invalidation indication information and the address information that corresponds to the first default bearer and is determined by the determination unit, so that the terminal device deletes, according to the address information invalidation indication information, the address information corresponding to the first default bearer.

A terminal device includes:

a receiving unit, configured to receive a notification message that indicates address information invalidation and is sent by a mobile device, where the notification message includes address information invalidation indication information and address information corresponding to a first default bearer, and the first default bearer is a default bearer that is allocated to the mobile device and already released by a core network; and a deletion unit, configured to delete, according to the address information invalidation indication information received by the receiving unit, the address information corresponding to the first default bearer.

A system for notifying address information invalidation includes: a mobile device, a terminal device, and a core network, where the core network is configured to send, to the mobile device, a first notification message indicating release of a default bearer, where the first notification message includes a first default bearer that is allocated to the mobile device and already released by the core network;

the mobile device is configured to receive the first notification message sent by the core network; determine, according to the first default bearer, address information corresponding to the first default bearer; and send, to the terminal device, a second notification message indicating address information invalidation, where the second notification message includes address information invalidation indication information and the address information corresponding to the first default bearer, so that the terminal device deletes, according to the address information invalidation indication information, the address information corresponding to the first default bearer; and the terminal device is configured to receive a notification message that indicates the address information invalidation and is sent by the mobile device, where the notification message includes the address information invalidation indication information and the address information corresponding to the first default bearer, and the first default bearer is a default bearer that is allocated to the mobile device and already released by the core network; and delete, according to the address information invalidation indication information, the address information corresponding to the first default bearer.

In the method, apparatus, and system for notifying and obtaining address information invalidation according to the embodiments of the present invention, the mobile device receives a notification message that indicates release of a default bearer and is sent by the core network, obtains address information corresponding to the released default bearer, and sends notification information to the terminal device according to the address information, so that the terminal device deletes the address information, enabling the user to perform an Internet access service without using the invalidated address information. Compared with the prior art in which a virtual network card of the terminal device is turned off to prevent the user from using the address information to perform the Internet access service, the present invention guarantees the use of non-invalidated address information by the terminal device.

BRIEF DESCRIPTION OF THE DRAWINGS

To illustrate the technical solutions in the embodiments of the present invention or in the prior art more clearly, accompanying drawings required for describing the embodiments or the prior art are briefly introduced in the following. Apparently, the accompanying drawings in the following descriptions merely show some embodiments of the present invention, and persons of ordinary skill in the art may still derive other drawings from the accompanying drawings without creative efforts.

DETAILED DESCRIPTION OF THE EMBODIMENTS

The technical solutions in the embodiments of the present invention are clearly and completely described in the following with reference to the accompanying drawings in the embodiments of the present invention. Apparently, the embodiments to be described are merely part rather than all of the embodiments of the present invention. All other embodiments obtained by persons of ordinary skill in the art based on the embodiments of the present invention without creative efforts shall fall within the protection scope of the present invention.

Figure 1:
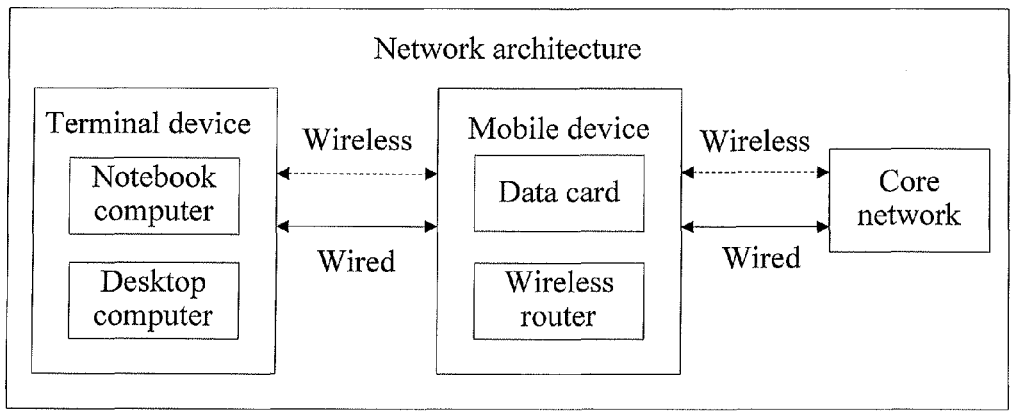
FIG. 1 is a composition block diagram of a network structure according to an embodiment of the present invention.

A technology described in this document may be applied in network architecture shown in FIG. 1. The network architecture includes a terminal device, a mobile device, and a core network, where the terminal device may be a device such as a notebook computer or a desktop computer, and the mobile device may be a device such as a data card or a wireless router. In the foregoing network architecture, the terminal device and the mobile device may be connected in a wired manner, for example, through a USB (Universal Series Bus, universal series bus), and may also be connected in a wireless manner, for example, through WiFi (Wireless Fidelity, wireless fidelity). The mobile device and the core network may be connected in a wired manner, for example, through an Ethernet line, and may also be connected in a wireless manner, for example, through Wi-Fi. All wired and wireless manners already implemented in the prior art may be used in the method illustrated in the present invention.

Embodiment 1

Figure 2:
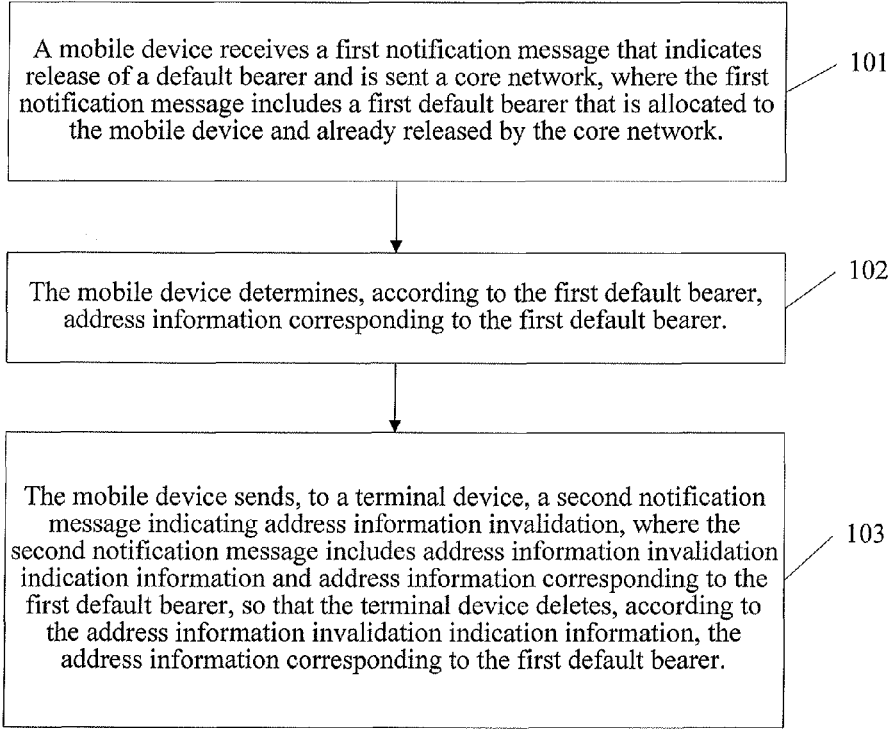
FIG. 2 is a flow chart of a method for notifying address information invalidation according to Embodiment 1 of the present invention.

An embodiment of the present invention provides a method for notifying address information invalidation. As shown in FIG. 2, the method is a method on a mobile device side, and includes:

101: A mobile device receives a first notification message that indicates release of a default bearer and is sent by a core network, where the first notification message includes a first default bearer that is allocated to the mobile device and already released by the core network.

The first default bearer may include one default bearer, and may also include multiple default bearers. If the first default bearer includes multiple default bearers, the multiple default bearers may be classified into two types according to address information corresponding to the multiple default bearers: one is an IPv4 (Internet Protocol Version 4, Internet protocol version 4) type, and the other is an IPv6 (Internet Protocol Version 6, Internet protocol version 6) type. The embodiment of the present invention does not limit specific content included in the first default bearer.

102: The mobile device determines, according to the first default bearer, address information corresponding to the first default bearer.

The first default bearer includes address information corresponding to the first default bearer and QoS (Quality of Service, Quality of Service) corresponding to the first default bearer. The determining, according to the first default bearer, the address information corresponding to the first default bearer may be directly obtaining the address information from the first default bearer, and a specific implementation method is a technology known to persons skilled in the art, so the details are not described in the embodiment of the present invention.

The address information may be of the IPv4 type, and may also be of the IPv6 type, or of a subsequent evolution type. According to different address information types, manners of presenting the address information are also different. Specific presenting manners are technologies known to persons skilled in the art, and are not limited in the embodiment of the present invention.

103: The mobile device sends, to a terminal device, a second notification message indicating address information invalidation, where the second notification message includes address information invalidation indication information and the address information corresponding to the first default bearer, so that the terminal device deletes, according to the address information invalidation indication information, the address information corresponding to the first default bearer.

It should be noted that, the mobile device bears the second notification message in a protocol packet, and sends, to the terminal device, the protocol packet bearing the second notification message.

The protocol packet is a DHCP NAK (Dynamic Host Configuration Protocol No Acknowledgement, dynamic host configuration protocol no acknowledgement) packet or an ICMPv6 RA (Internet Message Control Protocol Router Advertisement, Internet message control protocol router advertisement) packet.

Figure 3:
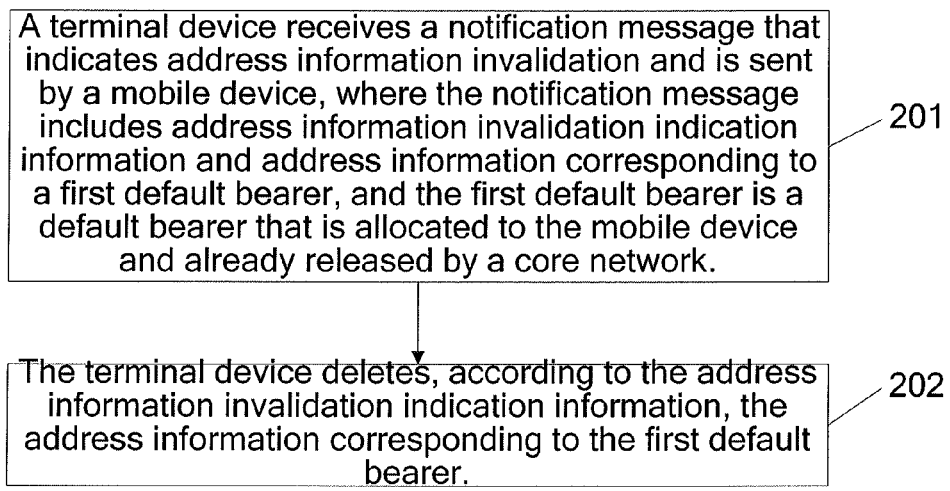
FIG. 3 is a flow chart of a method for learning address information invalidation according to Embodiment 1 of the present invention.

Correspondingly, the embodiment of the present invention further provides a method for learning address information invalidation. As shown in FIG. 3, the method is a method on a terminal device side, and includes:

201: A terminal device receives a notification message that indicates address information invalidation and is sent by a mobile device, where the notification message includes address information invalidation indication information and address information corresponding to a first default bearer, and the first default bearer is a default bearer that is allocated to the mobile device and already released by a core network.

Relevant description about the first default bearer is the same as that in step 101, so the details are not described in the embodiment of the present invention again.

202: The terminal device deletes, according to the address information invalidation indication information, the address information corresponding to the first default bearer.

The deleting, by the terminal device and according to the address information invalidation indication information, the address information corresponding to the first default bearer may be implemented through the following two methods, including:

First method: When the notification message that indicates the address information invalidation, received by the terminal device and is sent by the mobile device is a DHCP NAK packet, the terminal device parses the DHCP NAK packet, to obtain the address information invalidation indication information and the address information; and the terminal device deletes the address information according to the address information invalidation indication information.

Second method: When the notification message that indicates the address information invalidation, received by the terminal device and is sent by the mobile device is an ICMPv6 RA packet, the terminal device parses the ICMPv6 RA packet, to obtain the address information invalidation indication information and the address information; and the terminal device deletes the address information according to the address information invalidation indication information.

It should be noted that, a manner for the terminal device to delete the address information according to the address information invalidation indication information is deleting the address information from an address information list in the terminal device, so that the terminal device no longer uses the address information to perform an Internet access service. A specific implementation method is a technology known to persons skilled in the art, and is not limited in the embodiment of the present invention.

It can be seen that, in the method for notifying and learning address information invalidation provided in the embodiment of the present invention, the mobile device receives a notification message that indicates release of a default bearer and is sent by the core network, obtains address information corresponding to the released default bearer, and sends notification information to the terminal device according to the address information, so that the terminal device deletes the address information, enabling the user to perform the Internet access service without using the invalidated address information. Compared with the prior art in which a virtual network card of the terminal device is turned off to prevent the user from using the address information to perform the Internet access service, the present invention guarantees the use of non-invalidated address information by the terminal device.

Embodiment 2

Figure 4:
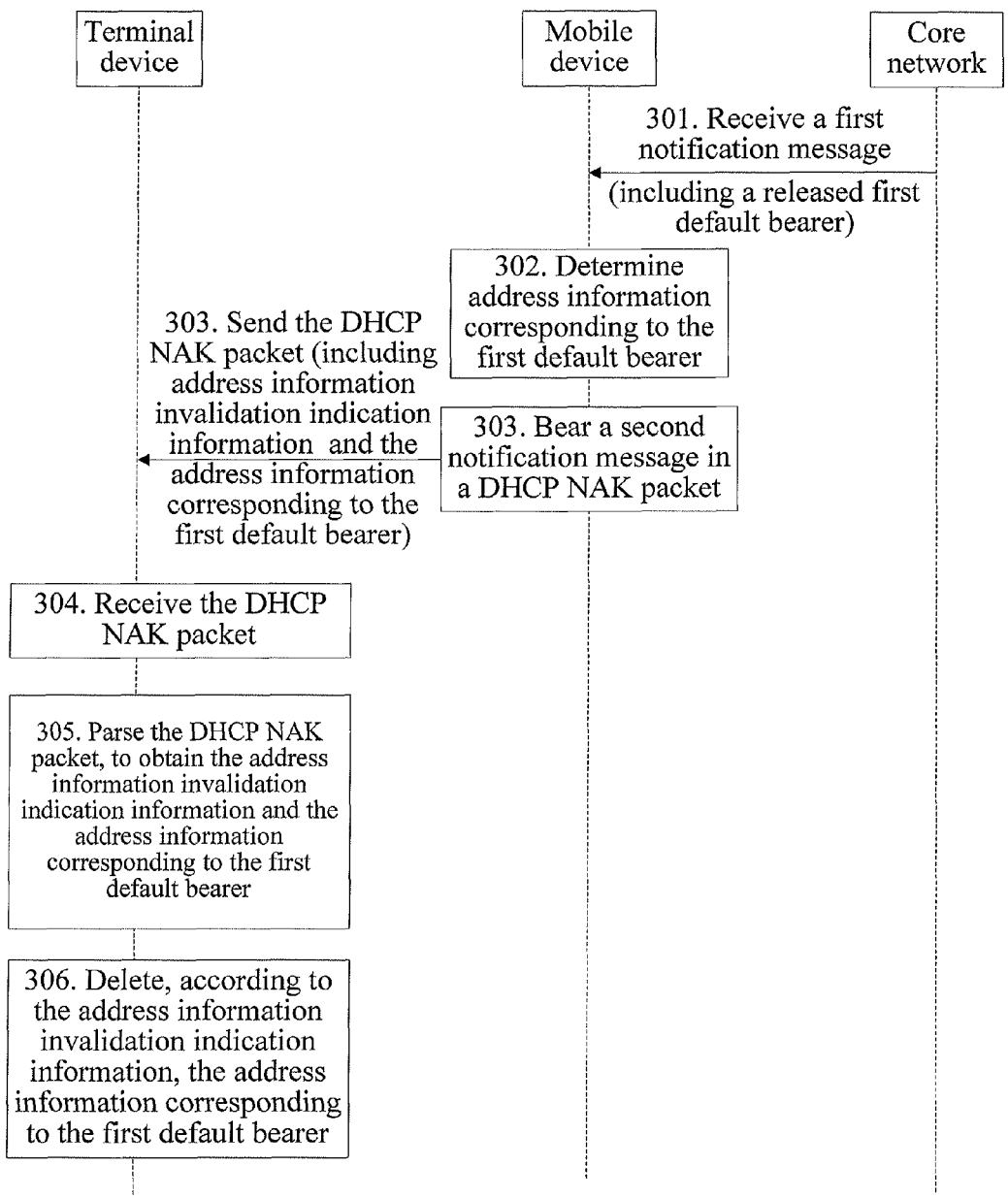
FIG. 4 is a flow chart of information interaction in a method for notifying and learning address information invalidation according to Embodiment 2 of the present invention.

An embodiment of the present invention provides an information interaction procedure in a method for notifying and learning address information invalidation. The method shown in FIG. 4 is a method for notifying and learning invalidation of IPv4-type address information, and includes:

301: A mobile device receives a first notification message that indicates release of a default bearer and is sent by a core network, where the first notification message includes a first default bearer that is allocated to the mobile device and already released by the core network.

Address information corresponding to the first default bearer is of an IPv4 type.

302: The mobile device determines, according to the first default bearer, the address information corresponding to the first default bearer.

The determining, according to the first default bearer, the address information corresponding to the first default bearer is implemented through the same method as that described in step 102, and is not limited in the embodiment of the present invention.

303: The mobile device bears the second notification message in a DHCP NAK packet, and sends the DHCP NAK packet to the terminal device, where the second notification message includes address information invalidation indication information and the address information corresponding to the first default bearer.

It should be noted that, the DHCP NAK packet uses a DHCPv4 packet format shown in table 1.

TABLE 1

| DHCP Packet Format | | | |
|---|---|---|---|
| OP(1) | Htype(1) | Hlen(1) | Hops(1) |
| Transaction ID(4) | | | |
| Seconds(2) | | Flags(2) | |
| Ciaddr(4) | | | |
| Yiaddr(4) | | | |
| Siaddr(4) | | | |

TABLE 1-continued

DHCP Packet Format

| OP(1) | Htype(1) | Hlen(1) | Hops(1) |
|---|---|---|---|
| Giaddr(4) | | | |
| Chaddr(16) | | | |
| Sname(64) | | | |
| File(128) | | | |
| Options(variable) | | | |

The address information invalidation indication information is borne in a second high bit of a flags (flag) field, and the address information corresponding to the first default bearer is borne in a yiaddr (Your (Client) IP Address, your (client) IP address) field. When the second high bit of the flags field is 1, it is indicated that the address information in the yiaddr field is invalid; and when the second high bit of the flags field is 0, it is indicated that the address information in the yiaddr field is valid. Therefore, when the mobile device sends, to the terminal device and by using the DHCP NAK packet, the second notification message indicating address information invalidation, the second high bit of the flags field is 1, and the address information corresponding to the first default bearer is filled in the yiaddr field.

304: The terminal device receives a DHCP NAK packet that indicates the address information invalidation and is sent by the mobile device, where the DHCP NAK packet includes the address information invalidation indication information and the address information corresponding to the first default bearer, and the first default bearer is a default bearer that is allocated to the mobile device and already released by the core network.

Relevant description about the first default bearer is the same as that in step 101, so the details are not described in the embodiment of the present invention again.

305: The terminal device parses the DHCP NAK packet, to obtain the address information invalidation indication information and the address information corresponding to the first default bearer, where the address information invalidation indication information is borne in the second high bit of the flags field of the DHCP NAK packet, and the address information is borne in the yiaddr field of the DHCP NAK packet.

It should be noted that, the obtained address information invalidation indication information is that the second high bit of the flags field in the DHCP NAK packet is 1, and the address information is address information in the yiaddr field in the DHCP NAK packet.

306: The terminal device deletes, according to the address information invalidation indication information, the address information corresponding to the first default bearer.

The deleting, by the terminal device and according to the address information invalidation indication information, the address information corresponding to the first default bearer is implemented through the same method as that described in step 202, so the details are not described in the embodiment of the present invention again.

In the method for notifying and learning address information invalidation provided in the embodiment of the present invention, the mobile device receives a notification message that indicates release of a default bearer and is sent by the core network, obtains IPv4-type address information corresponding to the released default bearer, and sends notification information to the terminal device according to the IPv4-type address information, so that the terminal device deletes the IPv4-type address information, enabling the user to perform an Internet access service without using the invalidated IPv4-type address information. Compared with the prior art in which a virtual network card of the terminal device is turned off to prevent the user from using the address information to perform the Internet access service, the present invention guarantees the use of non-invalidated address information by the terminal device.

Embodiment 3

Figure 5:
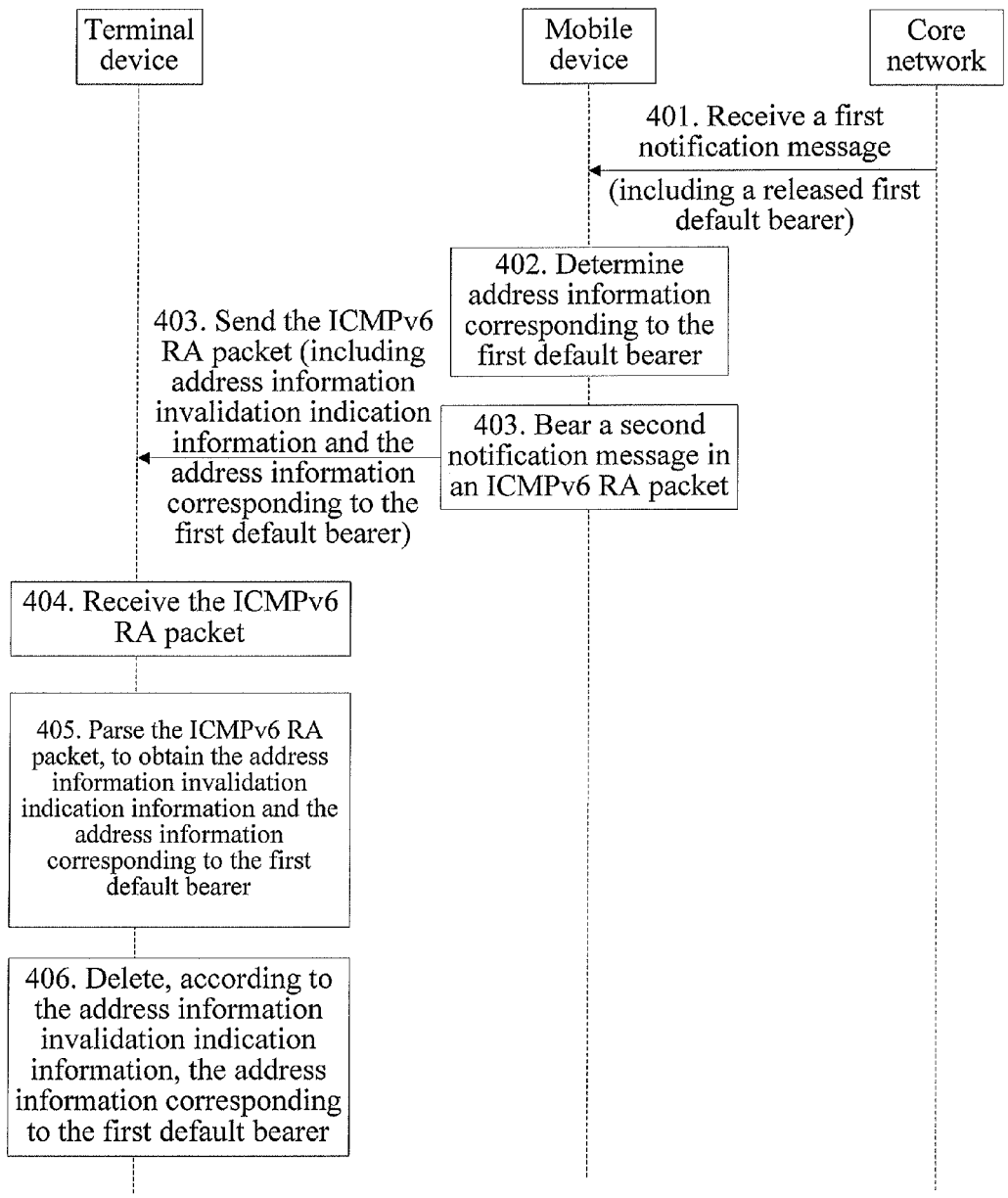
FIG. 5 is a flow chart of information interaction in a method for notifying and learning address information invalidation according to Embodiment 3 of the present invention.

An embodiment of the present invention provides an information interaction procedure in a method for notifying and learning address information invalidation. The method shown in FIG. 5 is a method for notifying and learning invalidation of IPv6-type address information, and includes:

401: A mobile device receives a first notification message that indicates release of a default bearer and is sent by a core network, where the first notification message includes a first default bearer that is allocated to the mobile device and already released by the core network.

Address information corresponding to the first default bearer is of an IPv6 type.

402: The mobile device determines, according to the first default bearer, the address information corresponding to the first default bearer.

The determining, according to the first default bearer, the address information corresponding to the first default bearer is implemented through the same method as that described in step 102, and is not limited in the embodiment of the present invention.

403: The mobile device bears the second notification message in an ICMPv6 RA packet, and sends the ICMPv6 RA packet to the terminal device, where the second notification message includes address information invalidation indication information and the address information corresponding to the first default bearer.

It should be noted that, the ICMPv6 RA packet uses an IPv6 prefix information packet format shown in table 2.

TABLE 2

IPv6 Prefix Information Packet Format

| Type | Length | Prefix Length | L | A | Reserved1 |
|---|---|---|---|---|---|
| Valid Lifetime | | | | | |
| Preferred Lifetime | | | | | |
| Reserved2 | | | | | |
| Prefix | | | | | |

The address information invalidation indication information is borne in a first high bit of a Reserved1 (reserved 1) field in Prefix Information (prefix information) in the ICMPv6 RA packet, and the address information corresponding to the first default bearer is borne in a prefix Prefix field in the ICMPv6 RA packet. When the first high bit of the Reserved1 field is 1, it is indicated that the address information in the Prefix field is invalid; and when the first high bit of the Reserved1 field is 0, it is indicated that the address information in the Prefix field is valid. Therefore, when the mobile device sends, to the terminal device and by using the ICMPv6 RA packet, the second notification message indicating address information invalidation, the first high bit of the Reserved1 field is 1, and the address information corresponding to the first default bearer is filled in the Prefix field.

404: The terminal device receives the ICMPv6 RA packet that indicates the address information invalidation and is sent by the mobile device, where the ICMPv6 RA packet includes the address information invalidation indication information and the address information corresponding to the first default bearer, and the first default bearer is a default bearer that is allocated to the mobile device and already released by the core network.

Relevant description about the first default bearer is the same as that in step 101, so the details are not described in the embodiment of the present invention again.

405: The terminal device parses the ICMPv6 RA packet, to obtain the address information invalidation indication information and the address information corresponding to the first default bearer, where the address information invalidation indication information is borne in the first high bit of the Reserved1 field in the Prefix Information in the ICMPv6 RA packet, and the address information is borne in the Prefix field in the ICMPv6 RA packet.

It should be noted that, the obtained address information invalidation indication information is that the first high bit of the Reserved1 field in the Prefix Information in the ICMPv6 RA packet is 1, and the address information is address information in the Prefix field in the ICMPv6 RA packet.

406: The terminal device deletes, according to the address information invalidation indication information, the address information corresponding to the first default bearer.

The deleting, by the terminal device and according to the address information invalidation indication information, the address information corresponding to the first default bearer is implemented through the same method as that described in step 202, so the details are not described in the embodiment of the present invention again.

In the method for notifying and learning address information invalidation provided in the embodiment of the present invention, the mobile device receives a notification message that indicates release of a default bearer and is sent by the core network, obtains IPv6-type address information corresponding to the released default bearer, and sends notification information to the terminal device according to the IPv6-type address information, so that the terminal device deletes the IPv6-type address information, enabling the user to perform an Internet access service without using the invalidated IPv6-type address information. Compared with the prior art in which a virtual network card of the terminal device is turned off to prevent the user from using the address information to perform the Internet access service, the present invention guarantees the use of non-invalidated address information by the terminal device.

Embodiment 4

Figure 6:
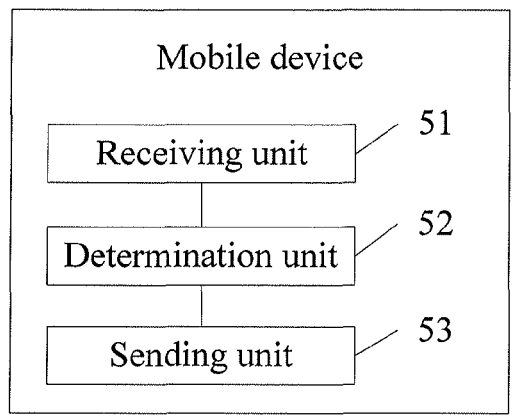
FIG. 6 is a composition block diagram of a mobile device according to Embodiment 4 of the present invention.

An embodiment of the present invention provides a mobile device. The mobile device may be specifically a device, such as a data card or a wireless router, capable of providing a data channel between a terminal device and a core network. As shown in FIG. 6, the apparatus includes: a receiving unit 51, a determination unit 52, and a sending unit 53.

The receiving unit 51 is configured to receive a first notification message that indicates release of a default bearer and is sent by the core network, where the first notification message includes a first default bearer that is allocated to the mobile device and already released by the core network.

The determination unit 52 is configured to determine, according to the first default bearer received by the receiving unit 51, address information corresponding to the first default bearer.

The sending unit 53 is configured to send, to the terminal device, a second notification message indicating address information invalidation, where the second notification message includes address information invalidation indication information and the address information that corresponds to the first default bearer and is determined by the determination unit 52, so that the terminal device deletes, according to the address information invalidation indication information, the address information corresponding to the first default bearer.

Optionally, the sending unit is specifically configured to bear the second notification message in a protocol packet, and send, to the terminal device, the protocol packet bearing the second notification message. The protocol packet is a DHCP NAK packet or an ICMPv6 RA packet. When the address information corresponding to the first default bearer is of an IPv4 type, the protocol packet is a DHCP NAK packet, the address information invalidation indication information is borne in the second high bit of a flag flags field in the DHCP NAK packet, and the address information corresponding to the first default bearer is borne in a client IP address yiaddr field in the DHCP NAK packet. When the address information corresponding to the first default bearer is of an IPv6 type, the protocol packet is an ICMPv6 RA packet, the address information invalidation indication information is borne in the first high bit of a first reserved Reserved1 field in prefix information Prefix Information in the ICMPv6 RA packet, and the address information corresponding to the first default bearer is borne in a prefix Prefix field in the ICMPv6 RA packet.

Figure 7:
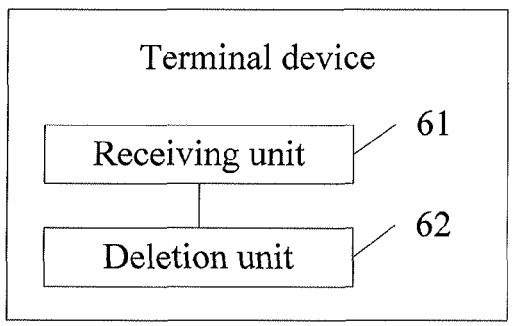
FIG. 7 is a composition block diagram of a terminal device according to Embodiment 4 of the present invention.

The embodiment of the present invention provides a terminal device. The terminal device may be specifically a computer, a notebook, a cell phone, a palmtop computer, a server, a virtual machine or the like. As shown in FIG. 7, the apparatus includes a receiving unit 61 and a deletion unit 62.

The receiving unit 61 is configured to receive a notification message that indicates address information invalidation and is sent by the mobile device, where the notification message includes address information invalidation indication information and address information corresponding to a first default bearer, and the first default bearer is a default bearer that is allocated to the mobile device and already released by a core network.

The deletion unit 62 is configured to delete, according to the address information invalidation indication information received by the receiving unit 61, the address information corresponding to the first default bearer.

Figure 8:
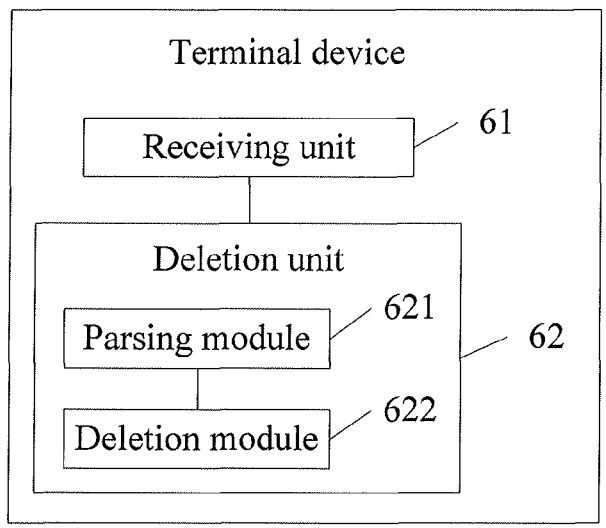
FIG. 8 is a composition block diagram of another terminal device according to Embodiment 4 of the present invention.

Optionally, as shown in FIG. 8, the deletion unit includes: a parsing module 621 and a deletion module 622.

The parsing module 621 is configured to: when the notification message that indicates the address information invalidation, received by the receiving unit 61 and is sent by the mobile device is a DHCP NAK packet, parse the DHCP NAK packet, to obtain the address information invalidation indication information and the address information, where the address information invalidation indication information is borne in the second high bit in a flags field of the DHCP NAK packet, and the address information is borne in a yiaddr field of the DHCP NAK packet.

The deletion module 622 is configured to delete, according to the address information invalidation indication information obtained by the parsing module 621, the address information corresponding to the first default bearer.

The parsing module 621 is further configured to: when the notification message that indicates the address information invalidation, received by the receiving unit and is sent by the mobile device is an ICMPv6 RA packet, parse the ICMPv6

RA packet, to obtain the address information invalidation indication information and the address information corresponding to the first default bearer, where the address information invalidation indication information is borne in the first high bit in a Reserved1 field of Prefix Information in the ICMPv6 RA packet, and the address information is borne in a Prefix field of the ICMPv6 RA packet.

The deletion module 622 is configured to delete, according to the address information invalidation indication information obtained by the parsing module 621, the address information corresponding to the first default bearer.

Figure 9:
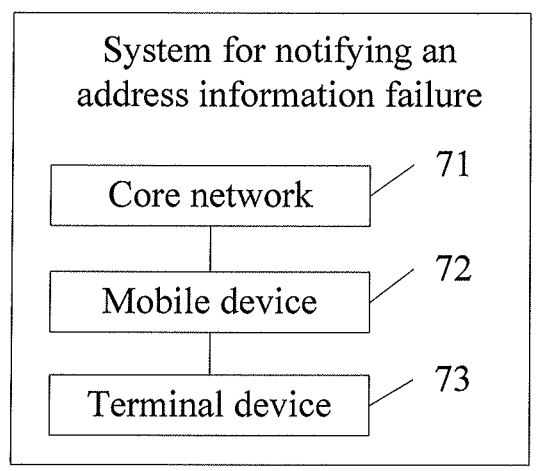
FIG. 9 is a composition block diagram of a system for notifying address information invalidation according to Embodiment 4 of the present invention.

The embodiment of the present invention provides a system for notifying and learning address information invalidation, and as shown in FIG. 9, the system includes a core network 71, a mobile device 72, and a terminal device 73.

The core network 71 is configured to send, to the mobile device 72, a first notification message indicating release of a default bearer, where the first notification message includes a first default bearer that is allocated to the mobile device and already released by the core network 71.

The mobile device 72 is configured to receive the first notification message sent by the core network 71; determine, according to the first default bearer, address information corresponding to the first default bearer; and send, to the terminal device 73, a second notification message indicating address information invalidation, where the second notification message includes address information invalidation indication information and the address information corresponding to the first default bearer, so that the terminal device 73 deletes, according to the address information invalidation indication information, the address information corresponding to the first default bearer.

The terminal device 73 is configured to receive a notification message that indicates the address information invalidation and is sent by the mobile device 72, where the notification message includes the address information invalidation indication information and the address information corresponding to the first default bearer, and the first default bearer is a default bearer that is allocated to the mobile device and already released by the core network 71; and delete, according to the address information invalidation indication information, the address information corresponding to the first default bearer.

In the apparatus and system for notifying and learning address information invalidation according to the embodiment of the present invention, the mobile device receives a notification message that indicates release of a default bearer and is sent by the core network, obtains address information corresponding to the released default bearer, and sends notification information to the terminal device according to the address information, so that the terminal device deletes the address information, enabling the user to perform an Internet access service without using the invalidated address information. Compared with the prior art in which a virtual network card of the terminal device is turned off to prevent the user from using the address information to perform the Internet access service, the present invention guarantees the use of non-invalidated address information by the terminal device.

Through the foregoing description of the implementation manners, persons skilled in the art can clearly understand that the present invention may be implemented in a manner of software plus necessary universal hardware, and definitely may be implemented by hardware, but in many cases, the former is a preferred implementation manner. Based on such an understanding, the essence of the technical solutions of the present invention or the part contributing to the prior art may be implemented in a form of a software product. The computer software product is stored in a readable storage medium, such as a floppy disk, hard disk, or optical disk of the computer, and includes several instructions for making a computer device (which may be a personal computer, a server, a network device, and the like) execute the methods described in the embodiments of the present invention.

The foregoing descriptions are merely specific implementation manners of the present invention, but are not intended to limit the protection scope of the present invention. Any variation or replacement readily figured out by persons skilled in the art within the technical scope disclosed in the present invention shall all fall within the protection scope of the present invention. Therefore, the protection scope of the present invention shall be subject to the protection scope of the appended claims.

What is claimed is:

1. A method for notifying address information invalidation, comprising:
    a user terminal device communicating to a core network through a mobile device, wherein the user terminal differs in functions from the mobile device;
    receiving by the mobile device from the core network, a first notification message that indicates release of a default bearer, the first notification message comprises a first default bearer which is both allocated to the mobile device, and has been released by the core network;
    determining by the mobile device, address information corresponding to the first default bearer; and
    sending by the mobile device to a user terminal device, a second notification message which indicates address information invalidation, wherein the second notification message comprises address information invalidation indication information and the address information which corresponds to the first default bearer;
    wherein in response to receiving the second notification message from the mobile device, the user terminal device deletes the received address information corresponding to the first default bearer according to the address information invalidation indication information which is comprised in the second notification message.

2. The method according to claim 1, wherein the sending to the user terminal device, the second notification message indicating address information invalidation, comprises the mobile device performing:
    bearing the second notification message in a protocol packet, and sending the protocol packet which bears the second notification message to the user terminal device.

3. The method according to claim 2, wherein the protocol packet is one of: a dynamic host configuration protocol no acknowledgement (DHCP NAK) packet, or an Internet message control protocol router advertisement (ICMPv6 RA) packet; wherein:
    when the address information corresponding to the first default bearer is of an Internet protocol version 4 (IPv4) type, the protocol packet is the DHCP NAK packet; and
    when the address information corresponding to the first default bearer is of an Internet protocol version 6 IPv6 type, the protocol packet is the ICMPv6 RA packet.

4. The method according to claim 3, wherein the second notification message further comprises:
    when the address information corresponding to the first default bearer is of the IPv4 type:

the address information invalidation indication information is borne in a second high bit of a flag flags field in the DHCP NAK packet, and the address information corresponding to the first default bearer is borne in a client IP address yiaddr field in the DHCP NAK packet; and when the address information corresponding to the first default bearer is of the IPv6 type:

the address information invalidation indication information is borne in a first high bit of a first reserved Reserved1 field in prefix information Prefix Information of the ICMPv6 RA packet, and the address information corresponding to the first default bearer is borne in a prefix Prefix field in the ICMPv6 RA packet.

5. A mobile device, comprising at least a processor coupled to a memory which stores program codes, wherein the processor executes the program codes in the memory to configure the mobile device to:

facilitate a user terminal device's communication to a core network through the mobile device, wherein the user terminal differs in functions from the mobile device;

receive from the core network, a first notification message which comprises a first default bearer which is both allocated to the mobile device and has already been released by the core network;

determine address information corresponding to the first default bearer; and send to the user terminal device, a second notification message which indicates address information invalidation, wherein the second notification message comprises address information invalidation indication information and the address information which corresponds to the first default bearer;

wherein the second notification message sent from the mobile device causes the user terminal device to delete the received address information corresponding to the first default bearer according to the address information invalidation indication information which is comprised in the second notification message.

6. The mobile device according to claim 5, wherein the mobile device is specifically configured to bear the second notification message in a protocol packet, and send the protocol packet which bears the second notification message to the terminal device.

7. The mobile device according to claim 6, wherein the protocol packet is one of: a DHCP NAK packet or an ICMPv6 RA packet; wherein:

when the address information corresponding to the first default bearer is of an IPv4 type, the protocol packet is the DHCP NAK packet; and when the address information corresponding to the first default bearer is of an IPv6 type, the protocol packet is the ICMPv6 RA packet.

8. The mobile device according to claim 7, wherein that the second notification message comprises:

when the address information corresponding to the first default bearer is of the IPv4 type:

the address information invalidation indication information is borne in a second high bit of a flag flags field in the DHCP NAK packet, and the address information corresponding to the first default bearer is borne in a client IP address yiaddr field in the DHCP NAK packet; and when the address information corresponding to the first default bearer is of the IPv6 type:

the address information invalidation indication information is borne in a first high bit of a first reserved Reserved1 field in prefix information Prefix Information of the ICMPv6 RA packet, and the address information corresponding to the first default bearer is borne in a prefix Prefix field in the ICMPv6 RA packet.

9. A user terminal device, comprising at least a processor coupled to a memory which stores program codes, wherein the processor executes the program codes in the memory to configure the user terminal device to:

communicate to a core network through a mobile device, wherein the user terminal differs in functions from the mobile device;

receive a notification message sent by the mobile device, wherein the notification message was previously sent from the core network to the mobile terminal, and the notification message is used to indicate address information invalidation, and wherein the notification message comprises address information invalidation indication information and address information corresponding to a first default bearer, and wherein the first default bearer is a default bearer which is both allocated to the mobile device and has already been released by the core network; and delete the received address information corresponding to the first default bearer according to the address information invalidation indication information which is comprised in the notification message.

10. The user terminal device according to claim 9, wherein the user terminal device is further configured to:

when the received notification message sent by the mobile device is a DHCP NAK packet that indicates the address information invalidation:

parse the DHCP NAK packet to obtain the address information invalidation indication information and the address information corresponding to the first default bearer, wherein the address information invalidation indication information is borne in a second high bit in a flags field in the DHCP NAK packet, and the address information is borne in a yiaddr field in the DHCP NAK packet; and delete the address information corresponding to the first default bearer according to the address information invalidation indication information which is comprised in the notification message.

11. The user terminal device according to claim 9, wherein the user terminal device is further configured to:

when the received notification message sent by the mobile device is an ICMPv6 RA packet that indicates the address information invalidation:

parse the ICMPv6 RA packet to obtain the address information invalidation indication information and the address information corresponding to the first default bearer, wherein the address information invalidation indication information is borne in a first high bit in a Reserved1 field in Prefix Information of the ICMPv6 RA packet, and the address information is borne in a Prefix field in the ICMPv6 RA packet; and delete the address information corresponding to the first default bearer according to the parsed address information invalidation indication information.

* * * * *